Jan. 10, 1961     S. F. KAPFF ET AL     2,967,422
AUTOMATIC BATCH END POINT MEASUREMENT
Filed Sept. 14, 1956     4 Sheets-Sheet 2

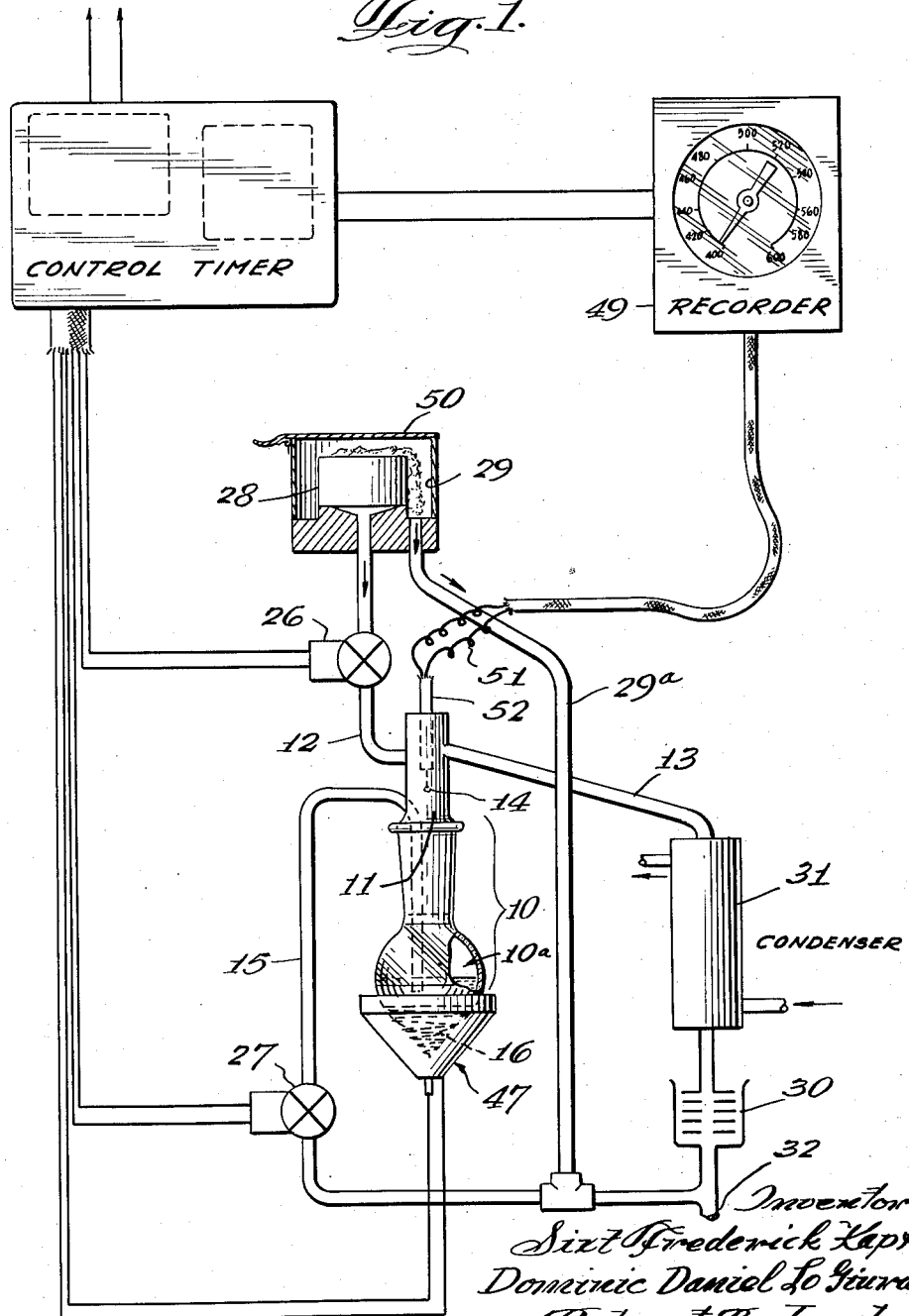

Inventors
Sixt Frederick Kapff
Dominic Daniel Lo Giurato
Robert B. Jacobs
By Everett Q. Johnson
Attorney Jan. 10, 1961 S. F. KAPFF ET AL 2,967,422
AUTOMATIC BATCH END POINT MEASUREMENT
Filed Sept. 14, 1956 4 Sheets-Sheet 3

Inventors
Sixt Frederick Kapff
Dominic Daniel Lo Giurato
Robert B. Jacobs
By Everett A. Johnson
Attorney

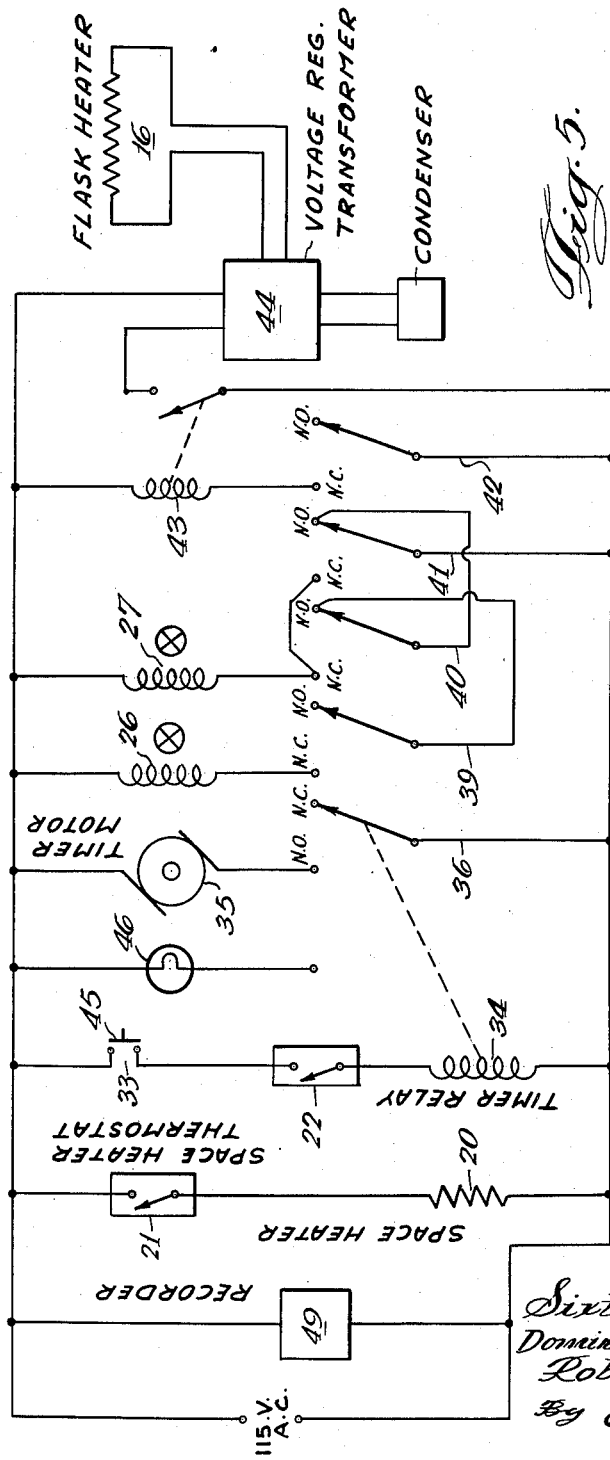
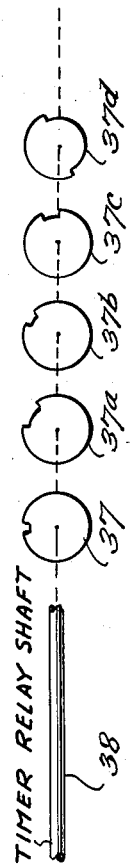
Fig. 5.

United States Patent Office 2,967,422
Patented Jan. 10, 1961

2,967,422

AUTOMATIC BATCH END POINT MEASUREMENT

Sixt Frederick Kapff, Homewood, Dominic Daniel Lo Giurato, Oaklawn, and Robert B. Jacobs, Homewood, Ill., assignors to Standard Oil Company, Chicago, Ill., a corporation of Indiana Filed Sept. 14, 1956, Ser. No. 609,889

5 Claims. (Cl. 73—17)

This invention relates to the automatic determination of the end point, i.e. the boiling point of the last volatile component of a mixture of liquids. More specifically, the invention relates to a system for measuring and recording the end point of a sample of a hydrocarbon distillate.

In the production of petroleum distillates, the primary specifications are those based on distillation properties. The high temperature end of the distillation curve is defined by specifying the highest temperature permissible for a given product when distilled according to ASTM procedures (ASTM Test D-158-53). This maximum temperature obtained by distilling the product to dryness is called the end point for that product.

Limitations are placed upon the end points of products, such as kerosenes and heater oils, to prevent contamination with higher boiling products. However, there frequently is considerable economical incentive to produce distillates having end points as close to the specific limit as possible. In order to approach such specification limits, it has heretofore been the practice to make laboratory analysis of grab samples, but such laboratory control of processing involves such long time lags between sampling, analysis, reporting and adjustment of the processing unit that close control of the unit has been impossible. Consequently, the specification limit could not be as closely approached as might be desired because of danger of producing off-specification product while waiting for the laboratory results.

It is, therefore, an object of this invention to provide a system which will give the process unit operator a reading of the end point of any sample in a short enough time to permit close control of the unit. A further object of the invention is to provide an apparatus which will determine the end point and make a record of such determination. Still another object of the invention is to provide an apparatus which will, in a continuous batch manner, determine the end point of a hydrocarbon distillate. A more particular object of our invention is to provide an apparatus which will determine the end point of hydrocarbon fluids, record the results of such determination, and automatically control the operating conditions of the processing unit which produced the hydrocarbon fluid under test. Still another object of the invention is to provide a system for end point analysis which minimizes the time lag between sampling and process control. These and other objects of our invention will become apparent as the description thereof proceeds.

Briefly, according to our invention, we provide an automatic batch-type instrument requiring only that the operator pour in a sample of approximately 100 cc. and press a button to obtain a test. Tests require about 15 minutes each and the results agree with those obtained by ASTM Test D-158-53. It is adaptable for use on samples having end points as low as 245° F. and as high as 650° F.

The instrument records end points within the interval 400° F. to 600° F. with a precision of ±5° F.. Within the interval of 460° F. and 600° F., the accuracy (±2° F.) is at least as good as that obtained with the ASTM standard test.

The apparatus consists of a sample cup, a flask in which the sample is contained for the determination of the end point, a low heat capacity heater capable of evaporating the sample to dryness, a thermocouple located to measure the temperature of the vapors escaping from the flask, and a recorder to indicate such vapor temperature. Solenoid-operated valves control the flow into and out of flask and a program timer controls the various steps of the testing cycle. The distillation flask is enclosed within a thermostatically-controlled chamber to reduce the effects of ambient temperature changes.

The advantages and additional details of our apparatus will be described by reference to the accompanying drawings forming a part of this specification and wherein:

Figure 1 is a schematic elevation of one embodiment of the invention;

Figure 5 is a schematic electrical circuit diagram including the program timer employed in Figures 1 and 4 with the timer at rest.

Figure 3:
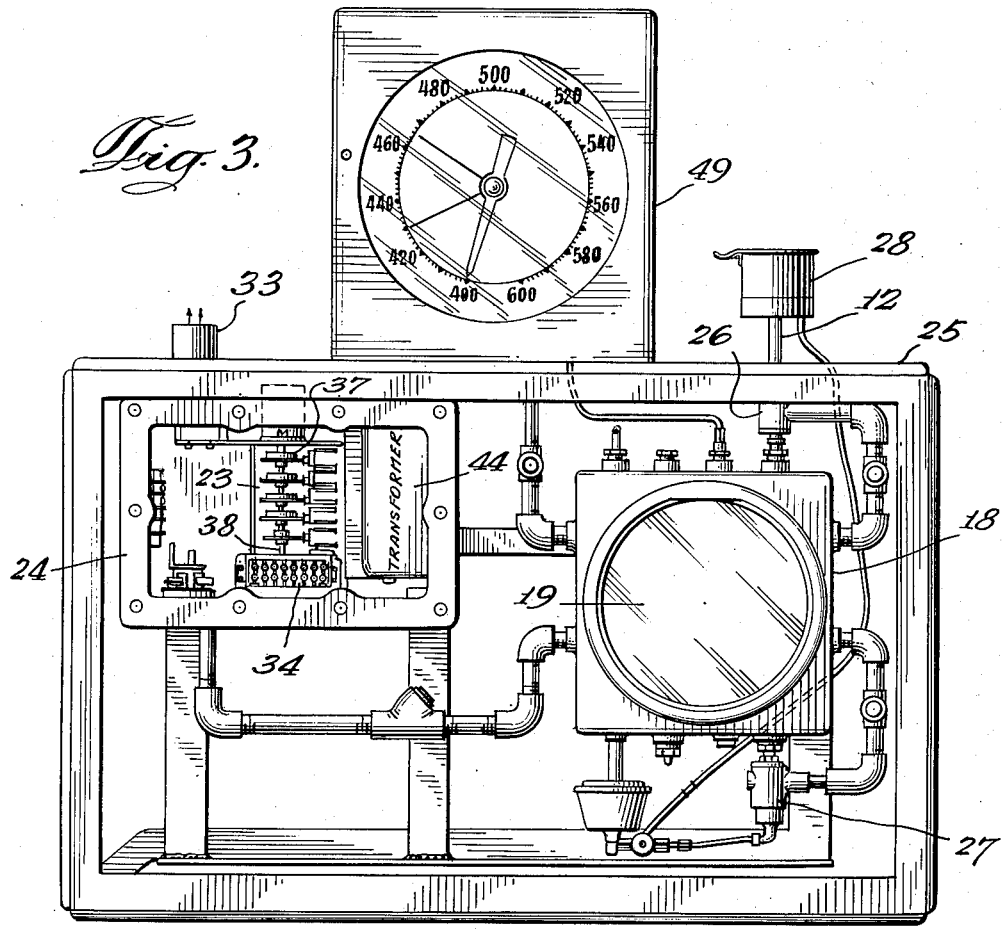
Figure 3 is an elevation of a preferred embodiment of the invention.

Referring to the drawings, the distillation unit includes the distillation flask 10 with its distilling head 11 including valved inlet line 12, vapor outlet tube 13, thermocouple 14 and the valved siphon line 15. The flask heater 16 is adjustably supported below the flask 10 on post 17 provided with an indexing means and the entire distillation unit is arranged within a temperature-controlled and explosion-proof housing 18 which may be provided with window 19 and a space heater 20 controlled by space thermostat 21. An inverse thermostat 22 controls power to the circuit including the program timer 23 which is housed within explosion-proof box 24. The program timer box 24 and the distillation unit housing 18 are mounted within a cabinet 25 which also includes the associated circuitry and the solenoid valves 26 and 27 on lines 12 and 15.

A sample cup 28, mounted on the top of the cabinet 25, is connected to the sample inlet line 12. The cup size is such that the operator need not measure out a given volume of sample, but merely fill the cup 28 to overflowing and a trough 29 conducts this excess via line 29a to the drain line 32. The explosion-proof drain 30 receives fluid from the condenser 31 for discharge through the drain line 32 with the liquid from overflow 29 and siphon line 15.

The test switch 33 activates the timer relay 34 only if the system is at a high enough temperature to actuate the inverse thermostat 22. Thus, we prevent operation of the test until the housing or box 18 has reached a preselected temperature. Further, no sample can be added during a heating or cooling period since the valve 26 remains closed and prevents the introduction of a subsequent sample from the cup 28.

Activation of the timer relay 34 initiates the program timer 23 for a single cycle of fifteen minutes, during which time the timer motor 35 and pilot light 46 receive power from switch 36 and the timer motor 35 rotates all the cams 37 on a common shaft 38.

At ten seconds after the test has been started, the cam 37a activates switch 39 causing valve 26 to open for twenty seconds and fill the flask 10 with sample. This time is sufficient to cause overfilling of the system with the excess running to the drain 30 through the condenser 31. At the end of the twenty-second filling period, the valve cam 37b activates switch 40 which simultaneously closes valve 26 and opens valve 27. The valve cam 37b will keep valve 26 closed and valve 27 open for a period of thirty-eight seconds, enabling the first siphoning to occur, and then the cam 37b will simultaneously close valve 27 and open valve 26. The cam 37a will now keep valve 26 open for a period of fifty-two seconds, causing the remainder of the sample to flow from the cup 28 into the flask 10. Eight seconds later or 128 seconds after the test has been started, the valve cam 37c activates switch 41 and opens valve 27 for sixty-four seconds, thus enabling the second siphoning to take place. After the second filling period or precisely 108 seconds after the test has been started, the heater cycle cam 37d activates switch 42 which causes the heater relay 43 to switch power at 6.3 volts to the flask heater 16 through the transformer 44. The heater 16 will remain on for 530 seconds. This is followed by a cooling period of 262 seconds which is terminated by the cycle timer cam 37a ending the fifteen-minute test.

Typically about 18.5±0.5 cc. of liquid remains in the flask 10 after siphoning. The neck has a ground standard taper to insure fitting with corresponding taper on the distilling head 11 and the center portion 10a of the flask 10 is silvered to reflect heat back to the sample.

The distilling head 11 is composed of the thermocouple 14, the inlet line 12, the vapor tube 13 and the siphon tube 15.

The thermocouple 14 is iron-constantan and the junction located in the distilling head 11 is glass capped. The lead wires 51 are sealed into jacket 52. The location of the thermocouple junction is critical; raising the thermocouple 14 lowers the maximum temperature recorded for a given sample, and the proper location can only be precisely determined by running samples of known end points.

The heater 16 comprises a ribbon of nichrome, which is coiled into a conical helix, and a stainless steel cup serving to support the nichrome ribbon and to act as a heater reflector 47. The heater 16 is positioned with respect to the flask 10 by a post 17 and a heater-position coupling 48. The heater 16 may be lowered and pivoted outward about the post 17 to permit removal of the flask 10.

When the heater 16 is turned on, it raises the temperature of the sample within the flask 10 and distillation soon begins. The condensing vapors escape through the vapor arm 13 on the distilling head 11 and heat the thermocouple 14 located within the distilling head 11. The recorder 49 records the temperature of the thermocouple 14 while the temperature is above 400° F. For most samples, the temperature reaches 400° F. about six minutes after the push button 45 of the test switch 33 is depressed and the pilot light 46 comes on. Near the end of the distillation, the amount of vapor condensing on the thermocouple 14 becomes less and less until the heat lost from the thermocouple 14 is greater than the heat supplied by the vapors. At this point, the thermocouple 14 begins to cool and the highest temperature recorded during the distillation is the end point of the sample.

Inverse thermoswitch 22 is mounted behind the flask 10 and its function is to prevent operation of the instrument until the temperature within the explosion-proof housing 18 containing the distillation unit has reached 120° F. The temperature of the housing 18 is controlled by thermostat 21 and space heater 20. The space thermostat 21 controls the temperature within the housing 18 at 130° F. and controls the space heater 20.

The solenoid valves 26 and 27 are explosion-proof and control the flow of the sample into and out of the flask 10 and are actuated by the program timer 23.

The sample cup 28, provided with hinged cover 50, has a capacity of about 100 cc. and surrounding the cup 28 is the overflow trough 29 which is connected to the drain line 32.

The condenser 31 condenses the vapors escaping from the flask 10 via vapor tube 13 and may be cooled by water introduced via line 53 entering the explosion-proof housing 18.

The test switch 33 is actuated by depressing the push button 45 and thereby initiates the fifteen-minute testing cycle by actuating the timer relay 34 which causes switch 36 to carry power to the timer motor 35 for a fifteen-minute period which is maintained and terminated by means of the timer relay cam 37.

The recorder 49 is a conventional potentiometer with cold end compensation and is calibrated for use with the iron-constantan thermocouple 14.

Referring to Figures 1 and 5, the operator fills the sample cup 28 to overflowing and immediately presses the push button 45. The pilot light 46 on top of the instrument case 25 indicates that a test is in progress. The program timer 23 opens the solenoid valve 26 allowing part of the sample to flow from cup 28 into the flask 10 and out the vapor tube 13 after the flask 10 is filled. The solenoid valve 26 is closed and solenoid valve 27 opens causing most of the sample to be siphoned from flask 10 by line 15. Solenoid valve 27 is closed and solenoid valve 26 is opened allowing the remainder of the sample to flow into the flask 10 and out the vapor tube 13.

The heater 16 is turned on and solenoid valve 26 is closed and solenoid valve 27 is opened causing the sample to be siphoned from the flask 10 by line 15 to a level determined by the position of the end of the siphon tube 15.

The program timer 23 then closes solenoid valve 27 and the heater 16 is turned off after four to five minutes and the flask 10 begins to cool. After a total operation of about fifteen minutes, the program timer 23 stops, the red light 46 is turned off, and the instrument is ready to receive another sample.

In the above operation, it will be noted that the timer 23 opens valve 26 letting part of the sample flow into the flask 10 and overflow out of the vapor tube 13; valve 26 is then closed and valve 27 opened siphoning most of the sample from the flask 10; valve 26 then is re-opened to let the remainder of the sample flow into the flask 10 and again overflow out the vapor tube 13. Valve 26 is then closed, valve 27 opened, and the excess sample is siphoned from the flask 10. Finally, the valve 27 is closed and the flask heater 16 is turned on and remains on for a sufficient time for the sample to evaporate completely.

The two complete filling and siphoning steps serve to remove any liquid residue remaining in the flask 10 from the previous test. In addition, this flushing cools the thermocouple 14 and the surrounding metal parts to insure that these components begin all tests at approximately the same temperature.

Figure 2:
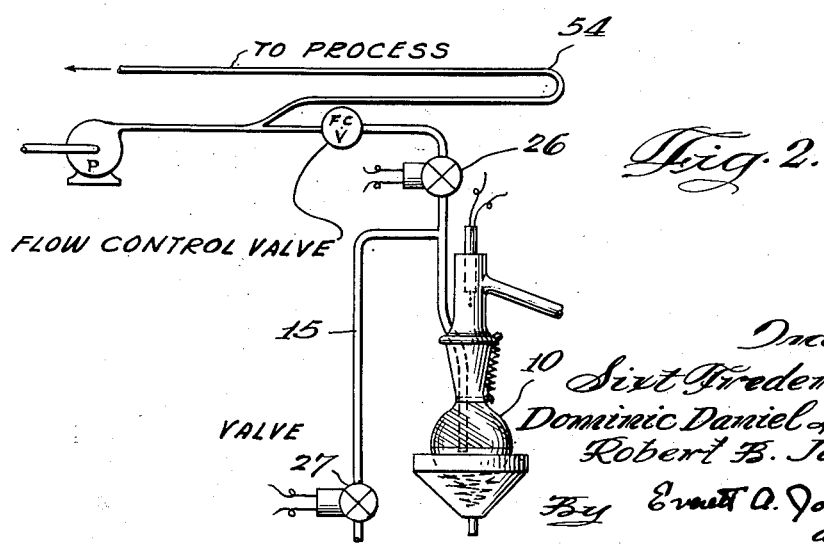
Figure 2 illustrates a modification of the means for filling the flask to make the device semi-continuous.
Figure 4:
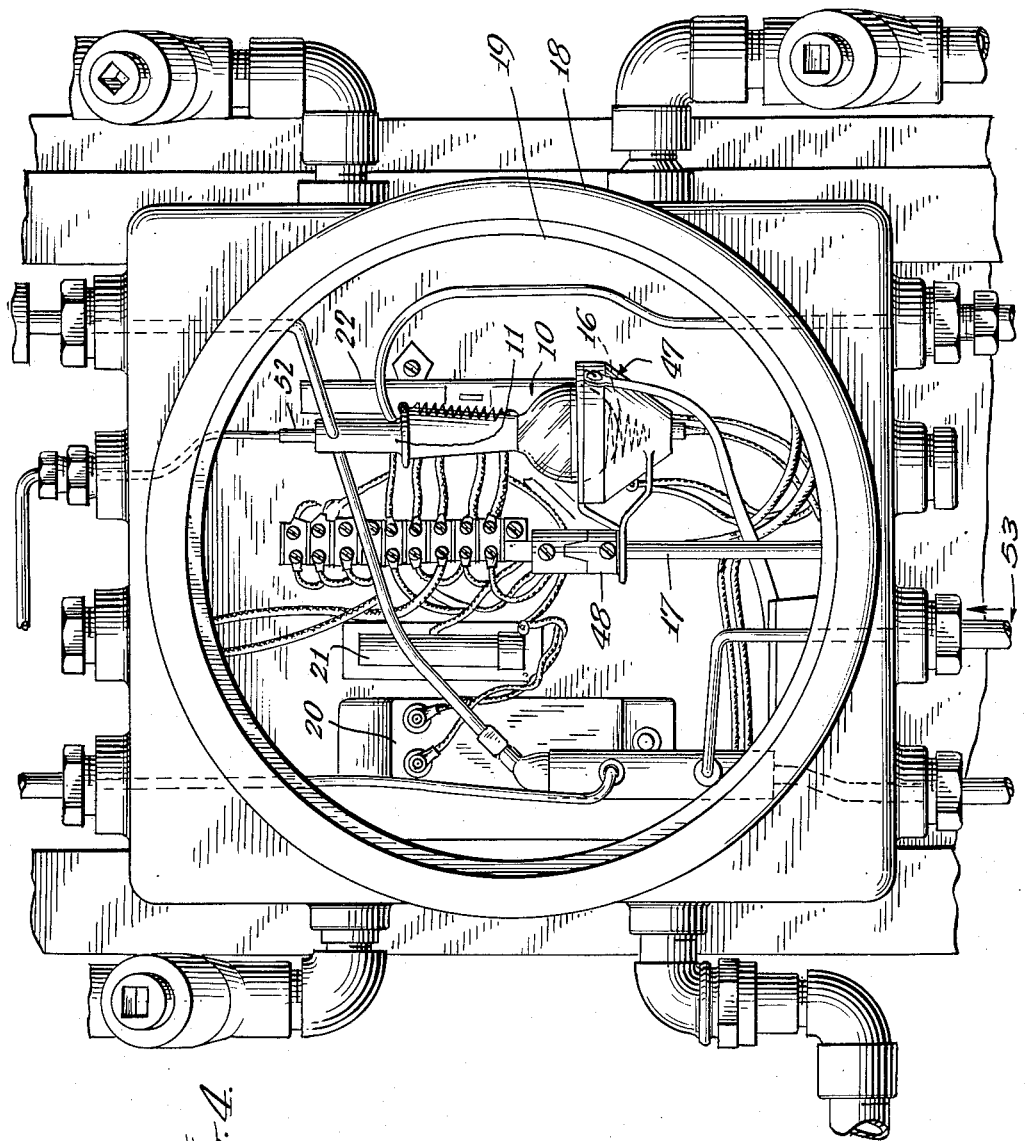
Figure 4 is an enlarged detail view of the distillation unit employed in the apparatus of Figure 3.

A modification of the means for filling the flask 10 is illustrated schematically in Figure 2. A small sample stream is provided from the circulating line 54 via line 55 having flow control valve 56 and this stream from the line 54 flows to the flask 10 and siphon line 15 continuously. The valve 26 is closed, the flask 10 siphons via line 15 to produce the appropriate size of sample, the valve 27 is closed, the heater 16 is turned on, and the remainder of the cycle is as described above. The operation of the circulating line 54 may be either by push button or by timer.

Although our invention has been described with reference to specific embodiments thereof, it should be understood that these are by way of illustration only and that modifications are contemplated without departing from the spirit of our invention.

What we claim is:

1. An apparatus adapted for the determination of end points of hydrocarbon liquids which includes in combination a distilling flask, electrical heater means for said flask, adjustable support means for said electrical heater means, said support means including a post and an indexed coupling whereby said heater means can be lowered from said flask and rotated about said post to permit manipulation of said flask, a distilling head superposing said distillation flask and comprising a closure therefor, temperature measuring means in said distilling head, supply line means discharging through said head for introducing a sample of liquid into said distillation flask, siphon tube means passing through said head and depending therefrom into said flask for removing excess sample from said flask, solenoid valve means on said supply line and on said siphon tube means, program timer means for controlling said solenoid valves, and elevater sample cup means discharging into said supply line, said sample cup having a capacity in excess of the ultimate sample to be tested, whereby a first quantity of the sample can be introduced into said flask and siphoned therefrom and a second quantity may be introduced into said flask and excess siphoned therefrom to leave a metered sample therein to be heated and vaporized.

2. Apparatus for automatically making successive end point determinations on liquid samples comprising in combination a distillation unit, a sample cup for receiving liquid samples to be charged to the distillation unit, said distillation unit including a flask and a separable distilling head, a delivery conduit between said sample cup and said distillation unit, a first solenoid-controlled valve in said conduit, electrical heating means for said flask, thermocouple means disposed within said distilling head, a condensate line communicating with said distilling head to conduct vapors from said distillation unit, siphon tube means mounted through said distilling head and depending therefrom to a low point in said flask, a second solenoid valve means on said siphon tube, and program timer means controlling said first and second solenoid valves, whereby a portion of the sample from the sample cup is introduced through the first solenoid valve into the distillation unit during which time said second solenoid valve is closed and whereby said first solenoid valve is closed and said second solenoid valve is opened whereby excess liquid sample is removed from the flask.

3. An apparatus for making end point determinations on hydrocarbon liquids which comprises in combination a distillation unit, said distillation unit including a distillation flask, a distilling head comprising a closure for said flask and electrical heating means supporting said flask, an explosion-proof housing for said distillation unit, post means within said housing, vertically and laterally adjustable support means for said electrical heater carried by said post means, program timer means for controlling said distillation unit, space heater means within said housing adapted to maintain said housing at a preselected uniform temperature, sample cup means exterior of said housing, said sample cup means including an annular overflow trough, delivery conduit means between said sample cup means and said distilling head, a first solenoid valve means on said conduit means, siphon discharge tube means passing through said distilling head and depending therefrom into said flask to a point spaced from the bottom thereof, second solenoid valve means on said siphon tube means, said program timer also controlling the said first and second solenoid valve means, thermocouple means in said distilling head, and means exterior of said housing for indicating the end point temperature sensed by said thermocouple means.

4. The apparatus of claim 2 wherein said flask in said distillation unit is provided with a center wall portion having a heat reflector surface to reflect heat back to the sample.

5. An apparatus for making end point determinations on liquid samples comprising in combination a distillation unit, said distillation unit including a flask, an electrical heater for said flask, and a separable distilling head superposing said flask and comprising a closure therefor, said head including a fluid discharge line extending therefrom, supply conduit means for introducing liquid sample into said distillation unit through said head, a first solenoid-controlled normally closed valve means in said conduit, siphon tube means passing through said head and depending therefrom into said flask for removing excess sample from said flask, a second normally closed solenoid-controlled valve means on said siphon tube means, program timer means controlling said first and second valve means and said electrical heater, and thermocouple means disposed in said distilling head and in the path of fluid flow from said flask through said fluid discharge line, said program timer means controlling said first and second valve means whereby said first valve means on said conduit is opened and a first portion of the sample liquid flows into the said flask and overfills it so that sample liquid discharges through said fluid discharge line, most of said first portion is siphoned from the flask through said siphon tube, the flask is refilled to overflowing through said fluid discharge line and cools said thermocouple, the second valve means on said siphon tube is opened and excess sample liquid is siphoned from the flask to leave a selected volume of sample liquid therein to be heated and vaporized, and whereby said electrical heater is controlled.

References Cited in the file of this patent
UNITED STATES PATENTS

| | | |
|---|---|---|
| 1,632,748 | Parsons et al. | June 14, 1927 |
| 2,299,899 | Houghland | Oct. 27, 1942 |
| 2,594,683 | Rolfson | Apr. 29, 1952 |
| 2,663,379 | Doan | Dec. 22, 1953 |
| 2,752,776 | Kapff et al. | July 3, 1956 |

OTHER REFERENCES

Article: by Stevenson and Stark, published "Industrial and Engineering Chemistry," vol. 17, pages 679–683, 1925.